UNITED STATES PATENT OFFICE.

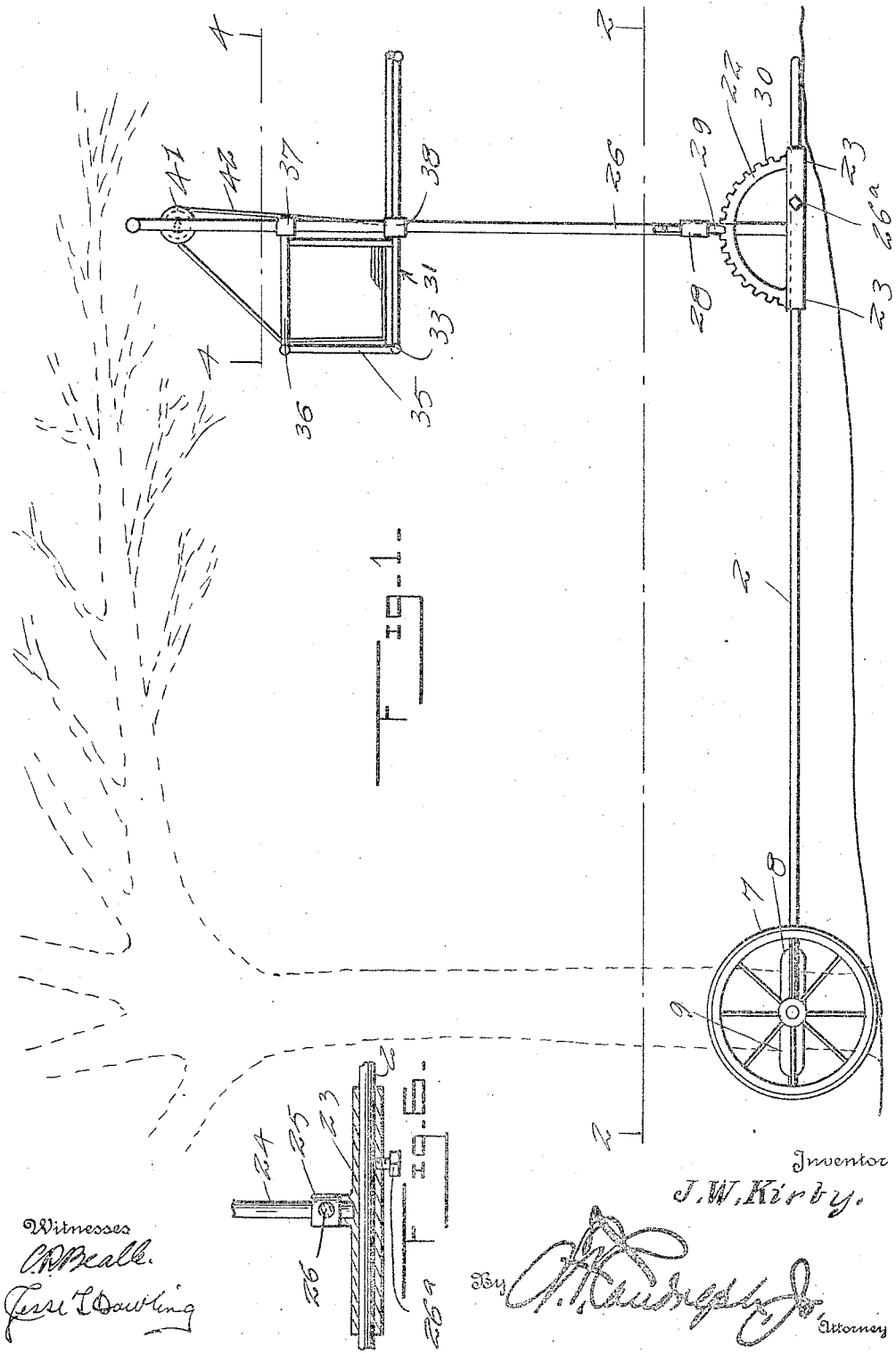

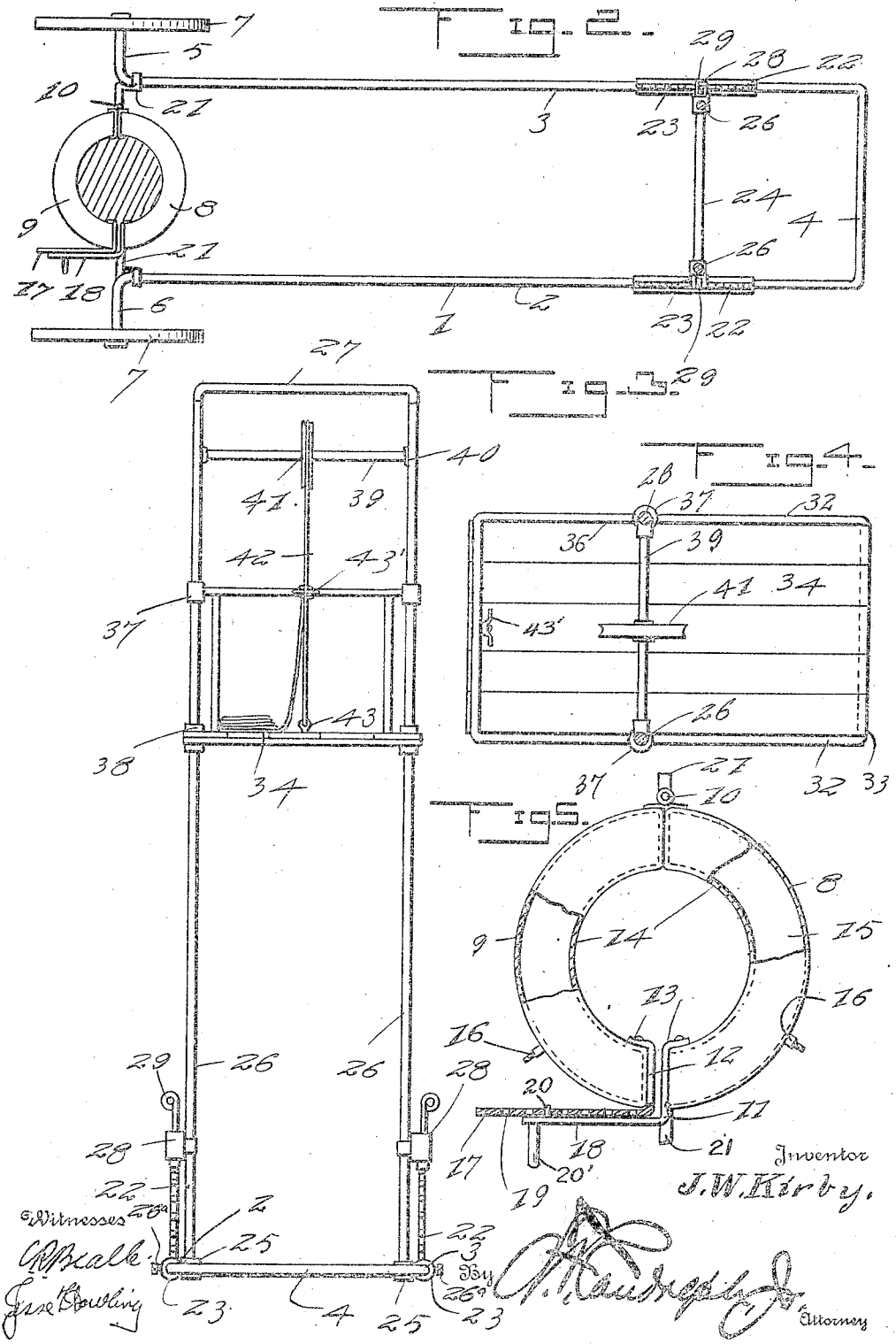

JAMES W. KIRBY, OF CLARKSBURG, WEST VIRGINIA.

FRUIT-PICKER'S PLATFORM.

1,362,944.  Specification of Letters Patent.  Patented Dec. 21, 1920.

Application filed January 3, 1917. Serial No. 140,389.

*To all whom it may concern:*

Be it known that I, JAMES W. KIRBY, a citizen of the United States, residing at Clarksburg, in the county of Harrison and State of West Virginia, have invented certain new and useful Improvements in Fruit-Pickers' Platforms; and I do hereby declare the following to be a full, clear, and exact description of the invention, such as will enable others skilled in the art to which it appertains to make and use the same.

My invention relates to improvements in mobile platforms for fruit pickers.

An important object of this invention is to provide a platform for fruit pickers which may be adjusted vertically and longitudinally to bring the fruit picker within convenient reach of the fruit to be picked.

Other objects and advantages of the invention will be apparent during the course of the following description.

In the accompanying drawings forming a part of this application and in which like numerals are employed to designate like parts throughout the same, Figure 1 is a side elevation of a fruit picker's platform embodying my invention, the same being shown in use, Fig. 2 is a horizontal section taken on line 2—2 of Fig. 1, Fig. 3 is an end elevation of the apparatus, Fig. 4 is a horizontal section taken on line 4—4 of Fig. 1, Fig. 5 is a plan view of the anchoring means for the frame, and, Fig. 6 is a detail sectional view of the connecting means between the base and the upright members.

In the drawings the numeral 1 generally designates a base, including longitudinal side members 2 and 3 connected at one end by a transversely extending bar 4. The free end portions of the side bars 3 and 2 are bent outwardly to provide axles 5 and 6 respectively. Wheels 7 are rotatably mounted on the axles 5 and 6 and provide means by which the apparatus may be moved from place to place.

A pair of semi-circular sections 8 and 9 have one of their meeting ends connected by a hinge 10. The free meeting ends of the sections 8 and 9 are provided with L-shaped arms 11 and 12 secured to the sections 8 and 9 as indicated at 13. The inner sides 14 of the sections 8 and 9 are adapted to engage the trunk of a tree as indicated in Fig. 2 for anchoring the frame beneath a tree. The sections 15 are preferably of an elastic material and are provided with chambers 15 adapted to be inflated with air through valves 16.

The outwardly extending arm 17 of the L-shaped member 12 extends parallel to the outwardly extending arm 18 of the L-shaped member 11 and is provided with a plurality of openings 19 receiving a lug 20 carried by arm 18. By inserting the lug 20 in any of the openings 19 the sections 8 and 9 may be adjusted to engage tree trunks of different diameters. A handle 20' is secured to the arm 18. Brackets 21 extend from the semi-circular sections and engage the side pieces 2 and 3 for connecting the semi-circular sections thereto.

As illustrated in Figs. 1, 2 and 3, a pair of segments 22 are connected to sleeves 23 slidably mounted on the side pieces 2 and 3. The sleeves 23 are slidably mounted on the side bars 2 and 3 and are held in adjusted positions by set screws 26$^a$. A transversely extending connecting bar 24 clearly indicated in Figs. 2 and 6 has its ends extended in bosses carried by the sleeves 23. Sleeves 25 are rotatably mounted on the end portions of the transverse bar 24 and have the lower ends of vertical standards 26 connected thereto. The upper ends of the standards 26 are connected by a transverse bar 27.

As indicated in Figs. 1 and 3, sleeves 28 are secured to the lower end portions of the standards 26 and carry slidable locking levers 29 adapted to engage teeth 30 of the segments 22. The engagement of the locking levers with the teeth 30 retains the standards in an adjusted position, either inclined or vertical.

A platform generally designated by the numeral 31 includes side pieces 32, end pieces 33 and floor boards 34. One of the ends of each side piece 32 is provided with vertical posts 35 having rearwardly extending rails 36. The rails 36 and the side pieces 32 are provided with alining sleeves 37 and 38 respectively. A shaft 39 is secured above the platform 31 as indicated at 40 and carries a pulley 41 over which a flexible cable 42 is extended. The cable 42 is secured at one end to the frame 31 as indicated at 43. To retain the platform at the desired elevation, the free end portion of the cable 42 is secured to a suitable locking device 43' carried by the platform.

In the use of my invention, the sections 8 and 9 are secured to the trunk of a tree and the standards 26 arranged at the desired angle. The platform 31 is now adjusted to the desired elevation to bring the operator or fruit picker within convenient reach of the fruit.

Having thus described my invention, what I claim is:

A fruit picker's platform including a frame having parallel side members, sleeves slidably mounted upon the side members, a bar connecting the sleeves together, standards pivoted upon the bar, a platform adjustably carried by the standards, dentate segments fixed to the sleeves and locking devices movably mounted upon the standards and engageable with the segments.

In testimony whereof I affix my signature in presence of two witnesses.

JAMES W. KIRBY.

Witnesses:
I. D. COLE,
S. H. WHITE.